No. 762,369. PATENTED JUNE 14, 1904.
I. WRAY.
PIE CUTTER.
APPLICATION FILED OCT. 14, 1903.
NO MODEL.

Witnesses:
F. L. Onrand
Wm. H. Onrand

Inventor
Isabelle Wray
By her Attorney
John A. Saul

No. 762,369.

Patented June 14, 1904.

UNITED STATES PATENT OFFICE.

ISABELLE WRAY, OF MAQUOKETA, IOWA.

PIE-CUTTER.

SPECIFICATION forming part of Letters Patent No. 762,369, dated June 14, 1904.

Application filed October 14, 1903. Serial No. 176,978. (No model.)

*To all whom it may concern:*

Be it known that I, ISABELLE WRAY, a citizen of the United States, residing at Maquoketa, in the county of Jackson and State of Iowa, have invented certain new and useful Improvements in Pie-Cutters, of which the following is a specification.

My invention relates to pie-cutters for the purpose of cutting the dough or paste preparatory to forming the pie, and has for its object to so construct a cutter that it may be operated with the greatest facility and may be easily and cheaply manufactured.

Figure 1:
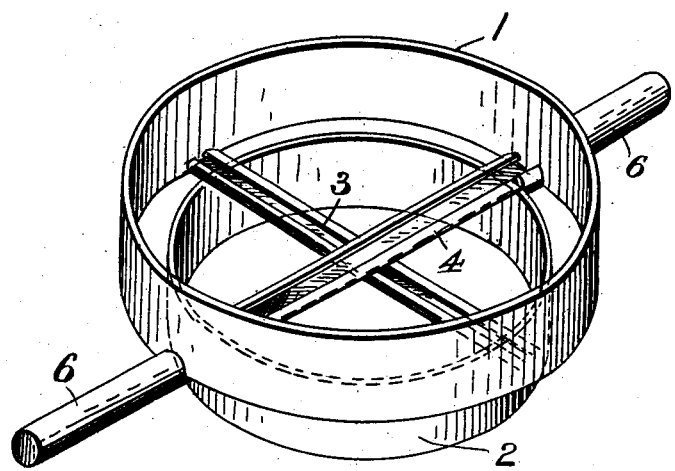
Figure 2:
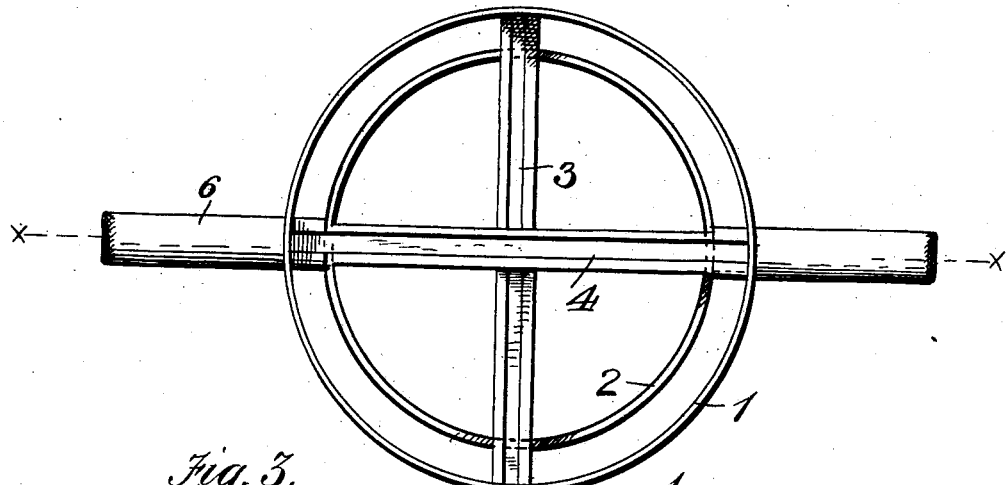
Figure 3:
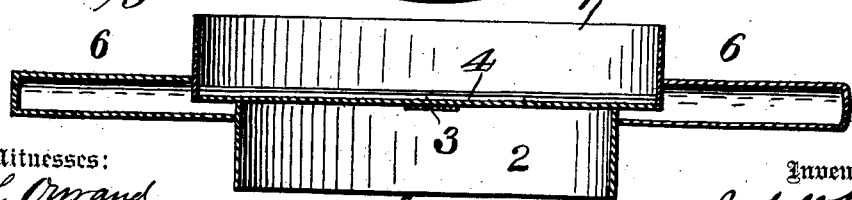

In the drawings forming a part of this invention, and in which like symbols of reference represent corresponding parts in the several views, Figure 1 is a perspective view of the device. Fig. 2 is a bottom plan, and Fig. 3 is a longitudinal section on line $x\ x$ of Fig. 2.

The device is constructed so as to present two concentric cutters 1 and 2 lying in different planes. Two cross-pieces 3 and 4 are soldered or otherwise secured to the small piece 2 and extend beyond the same a sufficient distance so as to reach and form supports for the ring or cutter 1, which is soldered to said ends.

6 represents handles for manipulating the device, being soldered or otherwise joined where the two cutters meet, two of the ends of the cross-pieces passing into and being soldered to the tubular handles.

The operation of the device will be apparent. The dough or paste being ready the larger side is first operated to cut the bottom of the pie. The device is then turned or reversed and the smaller cutter brought into play to cut the top of the pie.

The size of the cutters used will of course depend upon the size of the pie desired.

The use of the device does away with all trimming and the like, greatly facilitating the operation of pie-making.

Having now fully described my invention, what I claim as new, and desire to secure by Letters Patent, is—

1. In a pie-cutter, two concentric cutters of different diameters, lying with their cutting edges in different planes and their backs in substantially the same plane, and cross-pieces uniting them substantially in the plane of their backs.

2. In a pie-cutter, two concentric cutters of different diameters, lying with their cutting edges in different planes and their backs in substantially the same plane, cross-pieces extending the diameters of the cutters at their backs and connecting the same, and handles to manipulate the device.

In testimony whereof I affix my signature in presence of two witnesses.

ISABELLE WRAY.

Witnesses:
FRANK H. KECK,
C. R. BELL.